(12) United States Patent
Yeung et al.

(10) Patent No.: US 11,397,673 B2
(45) Date of Patent: Jul. 26, 2022

(54) METHOD AND SYSTEM FOR COMMUNICATION BETWEEN DUAL-MODE FLASH MEMORY CONTROLLER AND DUAL-MODE MEMORY

(71) Applicant: SUZHOU KUHAN INFORMATION TECHNOLOGIES CO., LTD., Jiangsu (CN)

(72) Inventors: Kwokwah Yeung, Jiangsu (CN); Di Xu, Jiangsu (CN); Kawing Cheung, Jiangsu (CN)

(73) Assignee: SUZHOU KUHAN INFORMATION TECHNOLOGIES CO., LTD., Jiangsu (CN)

( * ) Notice: Subject to any disclaimer, the term of this patent is extended or adjusted under 35 U.S.C. 154(b) by 0 days.

(21) Appl. No.: 17/596,377

(22) PCT Filed: Apr. 14, 2020

(86) PCT No.: PCT/CN2020/084744
§ 371 (c)(1),
(2) Date: Dec. 8, 2021

(87) PCT Pub. No.: WO2020/248700
PCT Pub. Date: Dec. 17, 2020

(65) Prior Publication Data
US 2022/0206939 A1    Jun. 30, 2022

(30) Foreign Application Priority Data
Jun. 10, 2019 (CN) .......................... 201910498525.5

(51) Int. Cl.
*G06F 12/02* (2006.01)
*G06F 13/16* (2006.01)

(52) U.S. Cl.
CPC ...... *G06F 12/0246* (2013.01); *G06F 13/1694* (2013.01); *G06F 2212/7208* (2013.01)

(58) Field of Classification Search
None
See application file for complete search history.

(56) References Cited

U.S. PATENT DOCUMENTS

2016/0140067 A1    5/2016    Gately et al.

FOREIGN PATENT DOCUMENTS

| CN | 101133404 A | 2/2008 |
|---|---|---|
| CN | 104035898 A | 9/2014 |

(Continued)

OTHER PUBLICATIONS

International Search Report (with English translation) and Written Opinion issued in PCT/CN2020/084744, dated Jun. 30, 2020, 9 pages provided.

*Primary Examiner* — Kevin Verbrugge
(74) *Attorney, Agent, or Firm* — Hamre, Schumann, Mueller & Larson, P.C.

(57) ABSTRACT

A method and system for communication between a flash memory controller and a nonvolatile memory. When a controller and all devices on a given channel are all set to be in a traditional mode, the controller and all the devices on the given channel are operated in the traditional mode; and when the controller and all the devices on the given channel are all set to be operated in a PAM mode, at a valid data transmission phase, the controller can send a command to a plurality of logical units on the same channel, and the plurality of logic units can return the command and/or a state on the same channel.

10 Claims, 6 Drawing Sheets

(56) References Cited

FOREIGN PATENT DOCUMENTS

| | | | |
|---|---|---|---|
| CN | 108205500 | A | 6/2018 |
| CN | 109840223 | A | 6/2019 |
| EP | 2217002 | A1 | 8/2010 |

METHOD AND SYSTEM FOR COMMUNICATION BETWEEN DUAL-MODE FLASH MEMORY CONTROLLER AND DUAL-MODE MEMORY

FIELD OF THE INVENTION

A unique Non-volatile Memory Controller (Controller) with Dual-Mode functionality, paired with one or more Non-volatile Memory Devices (Devices) with Dual-Mode functionality where new methods of issuing commands from the Controller to the Devices and returning status from Devices to Controller improve overall performance.

DESCRIPTION OF THE RELATED ART

A Non-volatile Memory Controller controls multiple Channels of Non-volatile Memory Devices. Each Channel usually consists of one or more CEs with each CE connected to a Target consists of one or more Logical Units (LUNs) or Dies.

In a traditional Controller and Devices setup, once a LUN commences the data transfer phase of a Program or Read operation, no other LUN on the same Channel can receive commands from the Controller without first interrupting the selected LUN's operation, even if the other LUNs are on a separate CE. Data transfer phases can be long for large data transfers.

In the traditional Controller and Device configuration, to be able to issue commands to other LUNs after a data input or output have been start, the Controller needs to perform the following sequence.

1. Suspend the current data transfer.
2. Wait for a data transfer to command delay, >=100 ns.
3. Issue the new command which will consists of at least one command sequence and zero or more address sequences. >=100 ns
4. Issue a command and address sequence to re-select the original data transfer LUN. >=100 ns
5. Wait for a command and/or address to data transfer delay, >=400 ns.
6. Resume data transfer.

This sequence is expensive and costs over 700 ns overhead. Since suspending and/or interrupting data transfer incurs heavy overhead, it is desirable to create alternative methods that allows for issuance of commands to LUNs connected to separate CEs on the same Channel to improve overall performance.

BRIEF SUMMARY OF THE INVENTION

The present invention provides an innovative and effective method of allowing Controller and Device to communicate with each other during active data transfer phases. In one embodiment of the invention, new interface signals are added for command/address and status check. In another embodiment no new pins are required such that the design can maintain backward compatibility with the Open NAND Flash Interface (ONFI) or Toggle standards.

In one embodiment of the invention, a Controller and Devices both can function in two modes. One mode is the traditional Controller and Devices configuration mode. In the second mode, Parallel Access Mode (PAM), both Controller and Devices are aware of each other's PAM capabilities. In one possible implementation, the Device implements a module that converts the command from the Command/Status bus and data from the data bus into internal ONFI compliant signals. The Device also implements a module that converts Device status return to Command/Status bus format. In PAM, the LUNs of the Device can be in one of three states, normal state, PAM data transfer state, or PAM command receive state. Once a LUN starts data transfer, the Controller can use either existing and/or new features and/or interfaces put the active LUN in the PAM data transfer state. Thereafter, the Controller can use either existing and/or new features and/or interfaces to issue commands to another LUN on the same channel.

In this embodiment, the Device has a mode register to indicate if it is operating in normal mode or PAM and state registers to indicate if the LUN is in normal state, PAM data transfer state, or PAM command receive state.

BRIEF DESCRIPTION OF THE DRAWINGS

The drawings illustrate only exemplary embodiments of the invention and therefore do not limit its scope because the inventive concepts lend themselves to other equally effective embodiments.

FIG. 4 (B) illustrates an embodiment of realizing backward compatibility of devices with ONFI standard interfaces.

FIG. 12 (B) illustrates a timing diagram of an embodiment in which the PAM command/status bus uses a I2C like bus standard to receive.

DESCRIPTION OF PREFERRED EMBODIMENT

Figure 1:
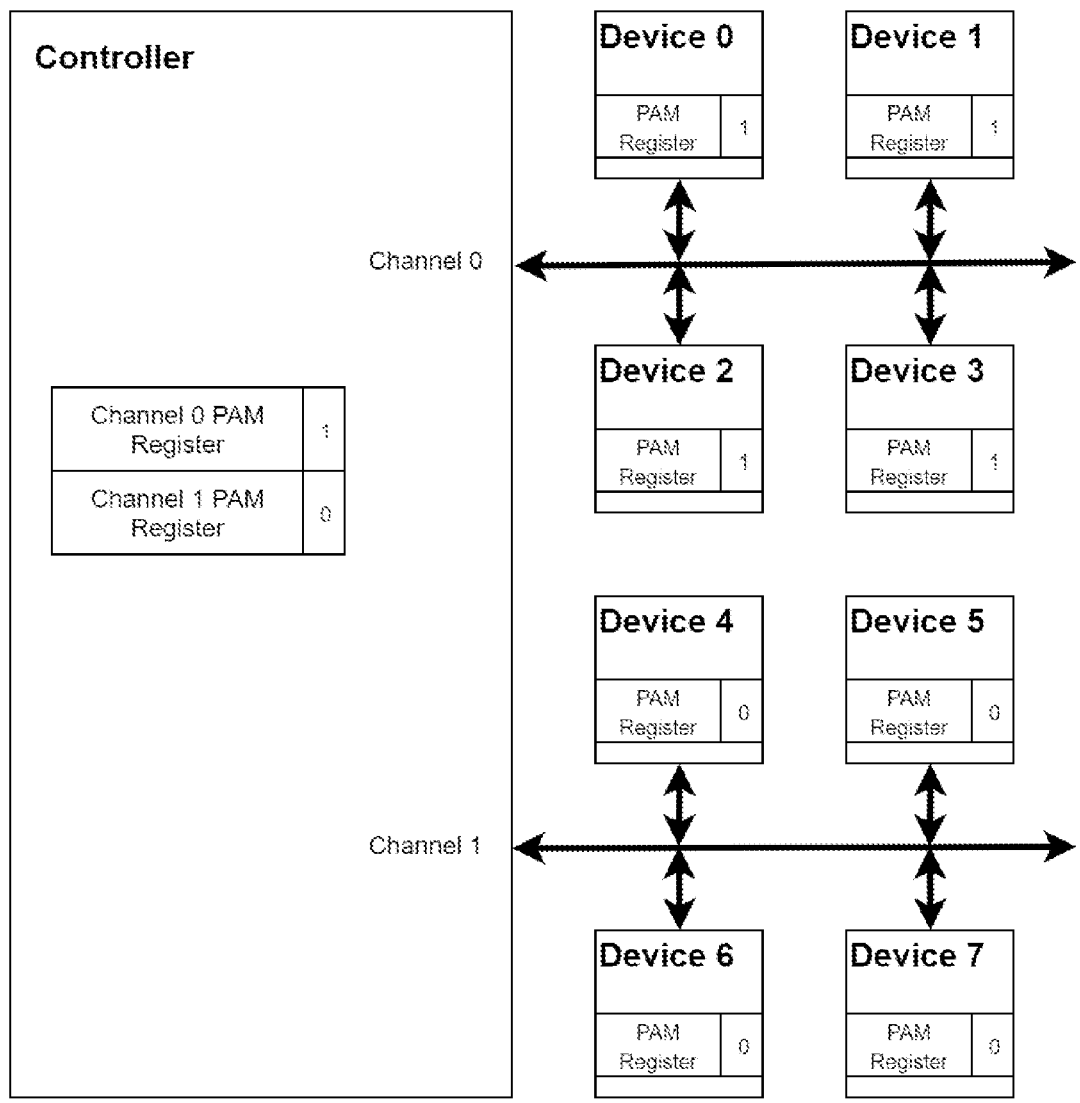
FIG. 1 illustrates a dual-mode Controller simultaneously controlling two separate channels with different modes of non-volatile memory, one in PAM and one in traditional mode.

FIG. 1 embodies a Controller controlling two separate channels, one in traditional mode and one in PAM. A way to configure the Controller to turn on PAM is through register settings. Each LUN controlled by the Controller can be individually configured.

A way to configure the Device to turn on PAM is through SET FEATURES command of ONFI standard.

A way to check if the Device can operate in PAM and its current mode of operation is through GET FEATURES command of ONFI standard.

Figure 2:
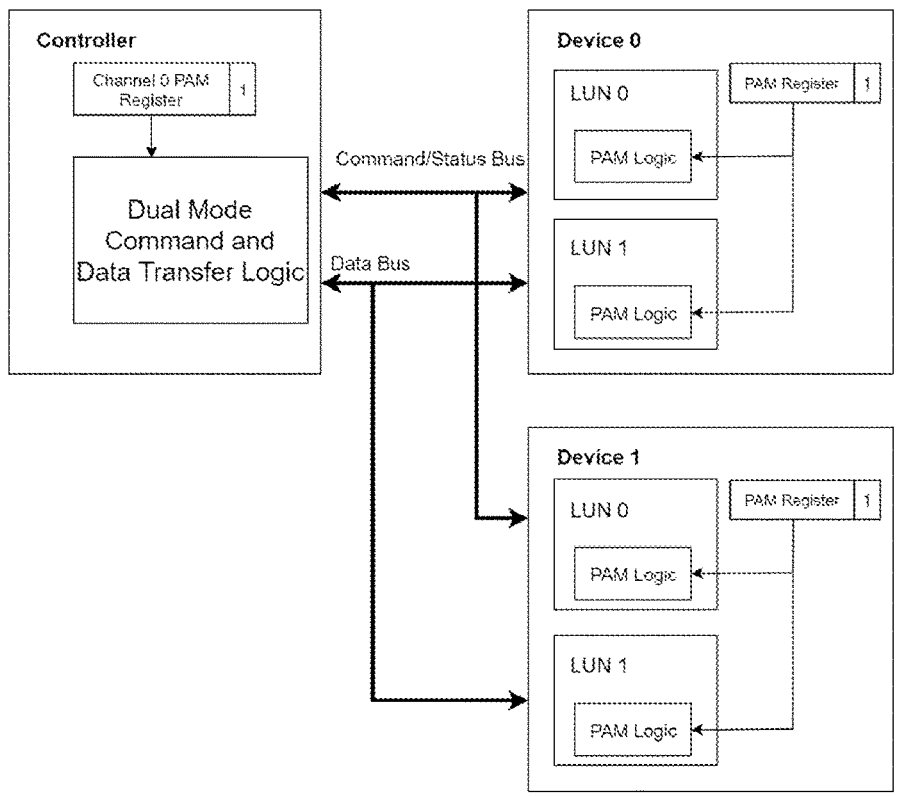
FIG. 2 illustrates an embodiment for a Controller and one of its channels.

FIG. 2 provides an embodiment for a Controller and one of its channels. Each channel of the Controller has a PAM logic module to control the Command/Status bus as well as the Data bus operations. The PAM Command and Data Transfer Logic can generate either ONFI compliant Command and Data transfers or it can generate PAM Command, Status, and Data transfers. In this embodiment the ONFI interface bus is a subset of the Command/Status Bus and the Data bus. In other implementations the Command/Status and Data bus can me realized using only ONFI interface signals. The type of command and data driven by the controller is configurable by the PAM Register of the Controller.

In this embodiment, each Channel is connected to two Devices each containing two Targets resulting in four Targets on the channel. Each Target contains one LUN. Each LUN of the PAM Device have a PAM Logic Module which converts CMD/Status and Data bus commands and transfers into ONFI interface compliant internal signals. The PAM Logic Module of each LUN is configured by the PAM Register of each Device.

Figure 3:
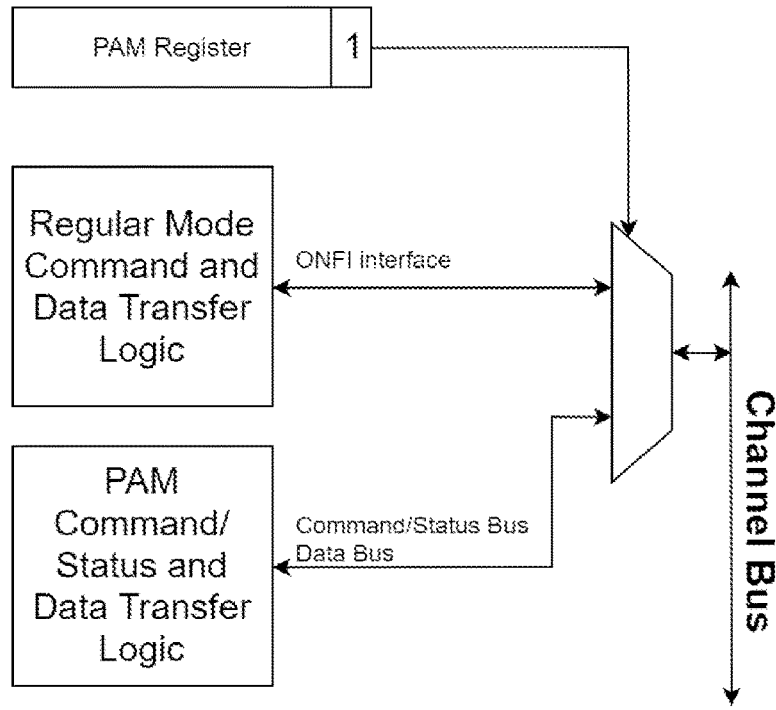
FIG. 3 illustrates an embodiment for the Dual-mode Command and Data Transfer Logic for one of the Controller Channels.

FIG. 3 provides an embodiment for the PAM Command and Data Transfer Logic for one of the Controller Channels. In this embodiment a PAM Register enables and disables the Regular Mode Command and Data Transfer logic and the PAM Command/Status and the Data Transfer Logic. The Regular Mode Command and Data Transfer logic generates ONFI interface compliant commands and data. The PAM Command and Data Transfer Logic generates a new Command/Status Bus and Data transfer interface which can be a superset of existing ONFI interface signals.

Figure 4A:
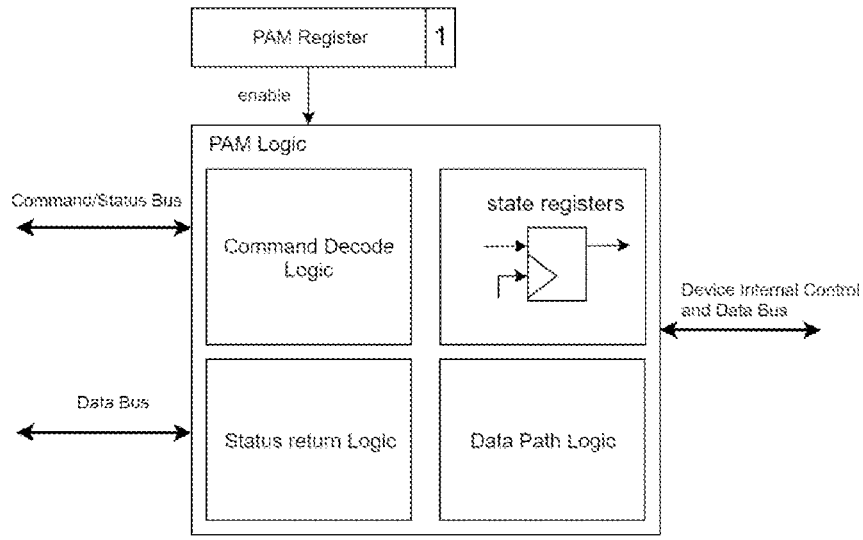
FIG. 4 (A) illustrates an embodiment of the PAM Logic Module for each LUN of a Device with PAM capability.
Figure 4B:
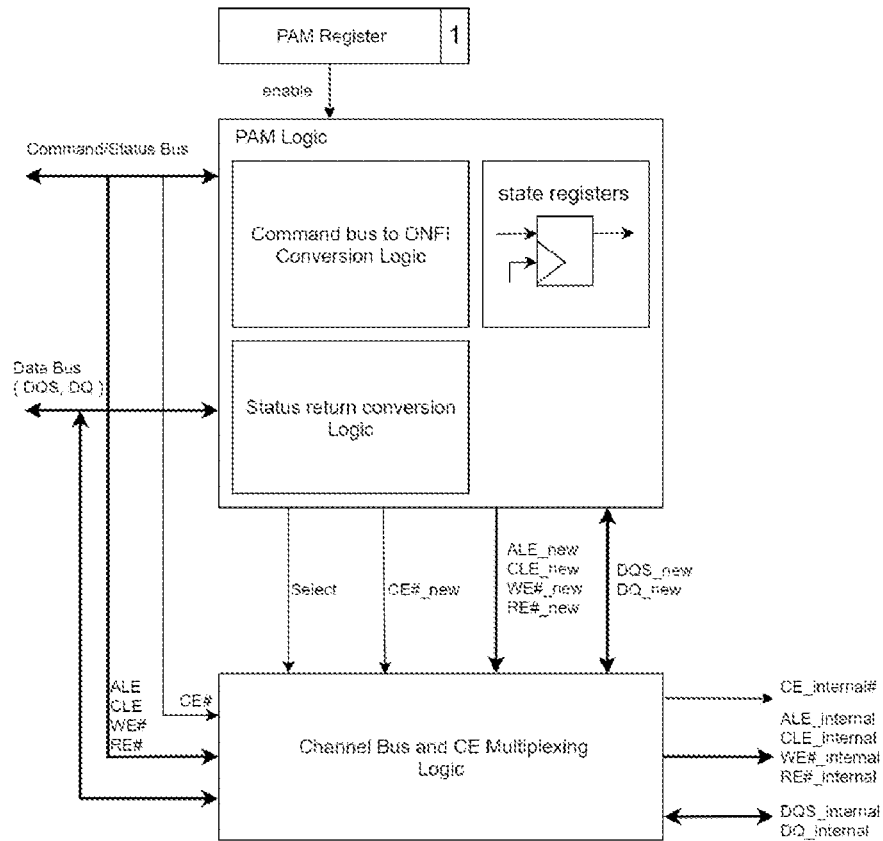

FIG. 4 (A) provides an embodiment of the PAM Logic Module for each LUN of a Device with PAM capability. A PAM Register of the Device configures the PAM Logic Module. This embodiment includes state registers, Command bus to ONFI conversion Logic, Status return conversion Logic, and Channel Bus and CE Multiplexing Logic. During normal mode operation, the LUN will receive commands normally through ONFI interface. When in PAM operation, the LUN will receive commands and return status through the Command/Status Bus and transfer data on the Data Bus. Commands are internally converted to ONFI compliant commands through the Command bus to ONFI Conversion Logic. Status is rerouted through the Status return conversion Logic.

In one embodiment of the invention the Command/Status Bus and Data bus of the design is a superset of the ONFI interface signals. All commands and status are issued and returned on the Command/Status Bus. The Data Bus is used for data transfer only. Once the data transfer has commenced for a LUN on the channel, other LUNs on the same channel can continue to receive commands that does not require immediate data transfer and return status.

Figure 5:
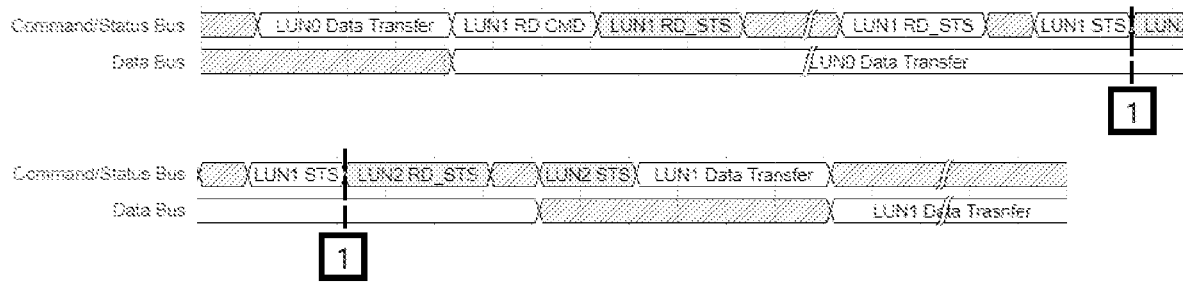
FIG. 5 illustrates a timing diagram of the Command/Status Bus and Data Bus of an embodiment.

FIG. 5 shows a timing diagram of the Command/Status Bus and Data Bus of the implementation described in the previous paragraph. The Controller first initiates data transfer for LUN0. As the data transfer for LUN0 is ongoing on the Data Bus, the Controller continues to issue commands to LUN1 and LUN2 and checks their status. The Device returns status on Command/Status Bus. Once the LUN0 data transfer is complete, the Controller issues another Data Transfer command to LUN1 and starts LUN1 data transfer on the Data Bus.

In another embodiment of the invention the Command/Status Bus is constructed out of a subset of existing ONFI interface pins such as ALE, CLE, WE#. The Device can be put into PAM states such that the Device knows when to listen for PAM command issue sequence and return status on the Command/Status Bus. The state registers can be used to differentiate between normal state, PAM data transfer state, and PAM command states.

Figure 6:
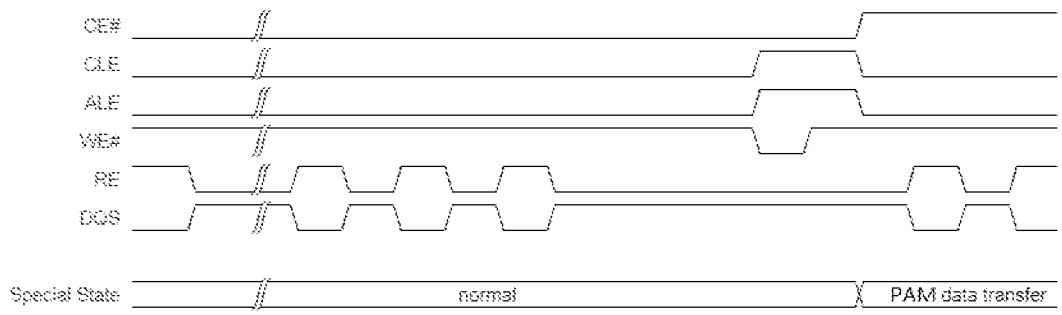
FIG. 6 illustrates one possible implementation's timing diagram for a Controller that uses ONFI to activate the PAM data transmission state of the LUN in the data transmission phase.

FIG. 6 is a timing diagram of one possible implementation for the Controller, using ONFI, to activate the PAM data transfer state of a LUN that is in data transfer phase. After data transfer have started for a LUN, the Controller pauses the data transfer by holding the DQS and RE static. After satisfying ONFI timing requirements, the Controller drives both ALE and CLE HIGH and toggles WE#. The active LUN of the Device in PAM will monitor for this condition and use WE# to latch the condition when both ALE and CLE are HIGH during the pause of data transfer. CE# is asserted HIGH after the PAM Data Transfer state is entered and said LUN will ignore further activities on CLE, ALE, and WE# lines but continue to handle all other signals normally until such a time when it receives an exit PAM data transfer state condition. The Controller then resumes data transfer and is ready to issue commands to LUNs on other Targets through PAM command receive state operations.

Figure 7:
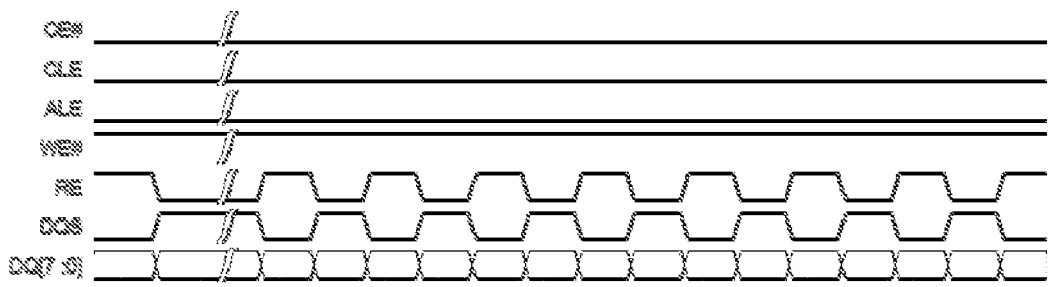
FIG. 7 illustrates the timing diagram of normal data transfer for Controller and Device, using ONFI and not in PAM.

FIG. 7 is the timing diagram of normal data transfer for Controller and Device, using ONFI, if PAM is not activated.

Figure 8:
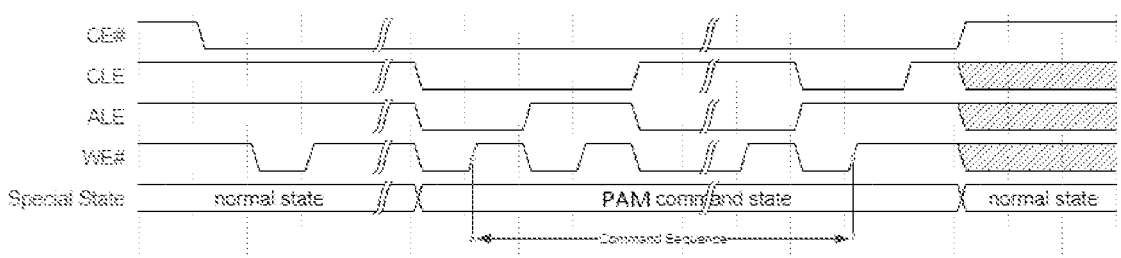
FIG. 8 illustrates the timing diagram of one possible implementation for the Controller, using ONFI, to issue commands to additional LUNs using ALE and CLE as data lines and WE# as strobe.

FIG. 8 is the timing diagram of one possible implementation for the Controller, using ONFI, to issue commands to additional LUNs using ALE and CLE as data lines and WE# as strobe. The Controller first select another Target by de-asserting CE# of the Target. After CE# have been de-assert the Controller will strobe WE# once while holding both CLE and ALE HIGH. LUNs in PAM will monitor for this condition and if detected will enter into PAM command receive state. In this state the LUNs of the selected Target will ignore all activities on RE#, DQS, and DQ. In this state the command will be transferred two bits at time on the CLE and ALE line with WE# as strobe. The Controller may first send a command such as CHANGE READ COLUMN ENHANCED to select an active LUN if there are multiple LUNs on the CE. After the Controller completes command transfer, it deselects the Target by re-asserting CE#.

Figure 9:
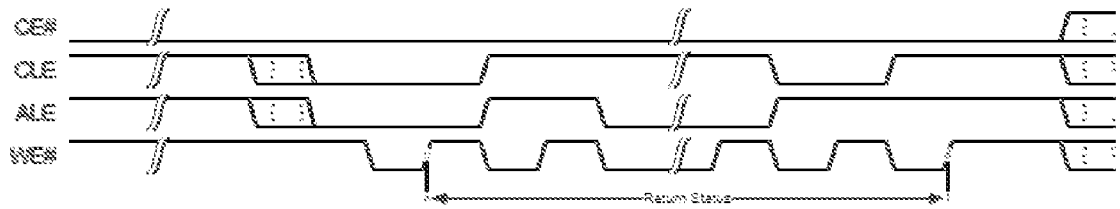
FIG. 9 illustrates a timing diagram of one possible implementation for the PAM LUN to return status.

FIG. 9 is a timing diagram of one possible implementation for the PAM LUN to return status. In this implementation CLE and ALE are bi-directional signals. While in PAM command state, after a command is issued and the appropriate timing for the operation have been met, the Controller sends a switch to output command to the selected LUN. After some appropriate wait period, the Device shall now drive ALE and CLE. The Controller will receive the data 2 bits at a time using WE# as strobe.

Figure 10:
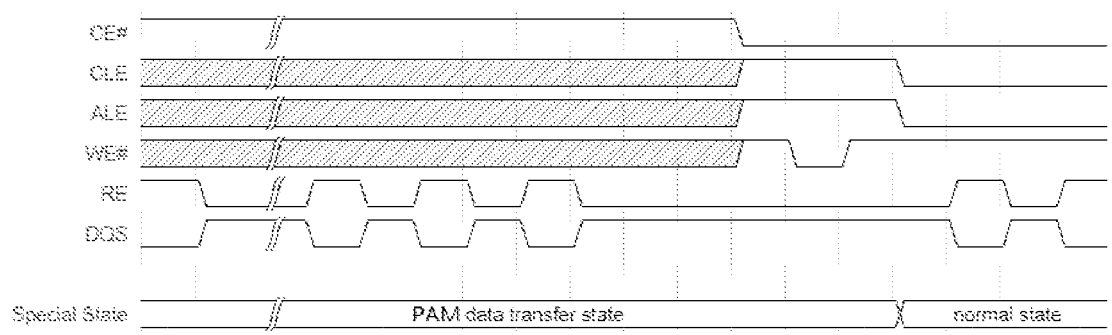
FIG. 10 illustrates a timing diagram of one possible implementation for the Controller, using ONFI, to regain control of the LUN in PAM data transfer state.

FIG. 10 is a timing diagram of one possible implementation for the Controller, using ONFI, to regain control of the LUN in PAM data transfer state. If the data transfer LUN is still in data transfer phase the data transfer can be paused with DQS and RE# held static. After meeting ONFI timing requirements the Controller will drive CE# low, drive CLE and ALE HIGH, and strobe WE#. If the LUN is no longer transferring data the Controller will drive CE# low, drive CLE and ALE HIGH, and strobe WE#. The LUN in PAM data transfer State will monitor for the aforementioned conditions and will then return to normal operation state when they are detected.

Figure 11:
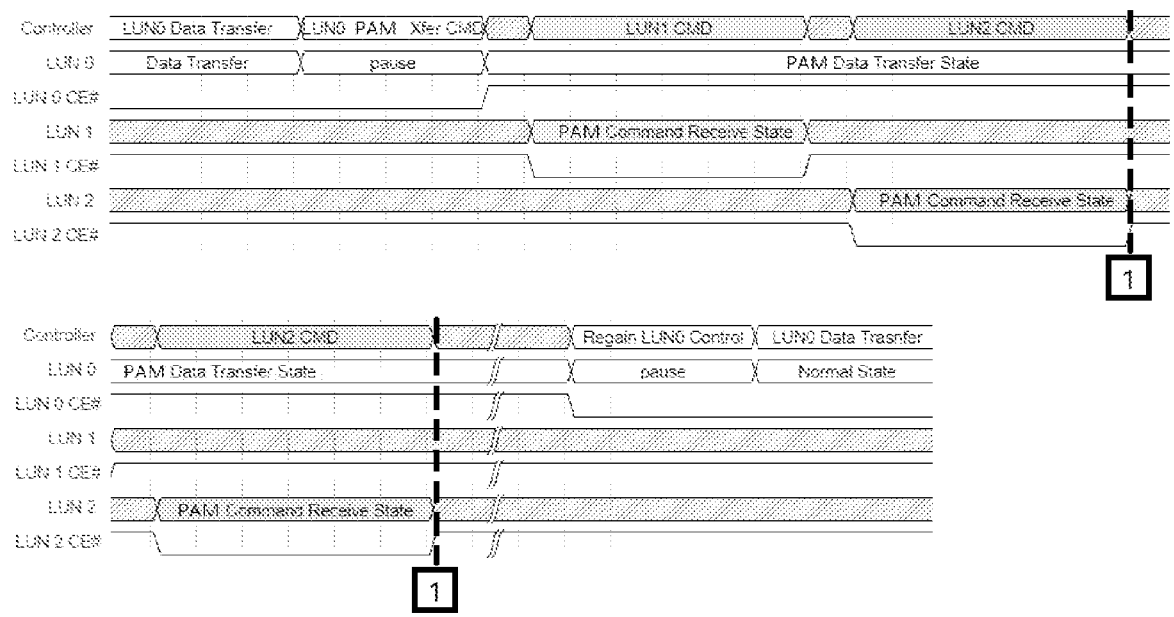
FIG. 11 illustrates a timing diagram showing performance improvement that can be achieved through PAM on the channel.

FIG. 11 is a timing diagram showing performance improvement that can be achieved on the channel for the system depicted in FIG. 1 using the PAM sequences in FIG. 6 to FIG. 10. Using this technique, the Controller can send commands to multiple alternative LUNs while the first one is in PAM data transfer mode until such time that the data transfer is complete, or the Controller wants to regain control of the data transfer LUN.

Figure 12:
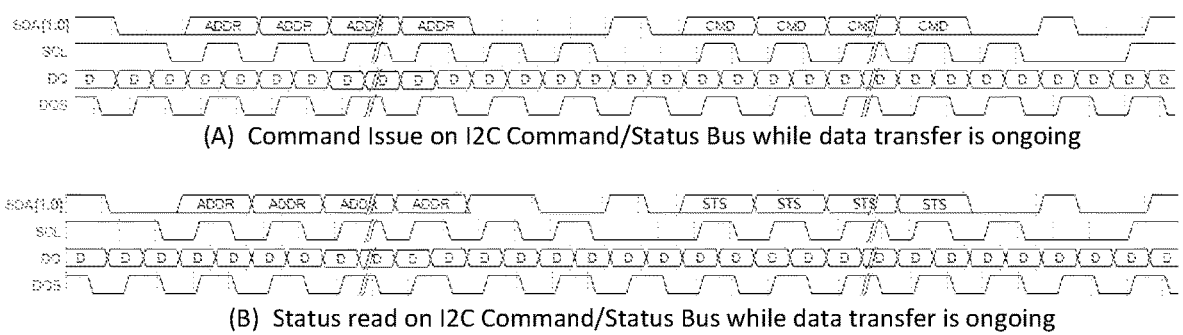
FIG. 12 (A) illustrates a timing diagram of an embodiment in which the PAM command/status bus uses a bus mechanism similar to I2C.

FIG. 12 is a timing diagram of an embodiment of the present invention, in which the command/status bus is implemented by using a high-speed I2C type protocol with one clock (SCL) line and multiple data (SDA) lines. The data line (DQ) and the data strobe line (DQS) are separated on the data bus. FIG. 12(A) shows that the command/status bus simultaneously issues a command when valid data is being transmitted on the data bus. FIG. 12(B) shows that the command/status bus simultaneously reads the status during valid data transmission on the data bus.

We claim:

1. A System comprising:
A non-volatile memory controller, which can operate in two modes, normal and parallel access mode (PAM), and comprising:
Control logic of one or more channels, each control logic comprising:
   A configuration logic for setting normal mode or PAM mode;
   One or more PAM state registers and PAM implementation logic;
   One or more dual-mode control logic and dual-mode multiplexing logic;
Non-volatile memory devices, which can operate in two modes, normal mode and PAM mode, comprising:
One or more logical units, each logical unit comprising:
   A configuration logic for setting normal mode or PAM mode;
   One or more PAM state registers and PAM implementation logic;
   Dual-mode multiplexing logic;
One or more channels, comprising a communication bus that implements command sending, status receiving, and data transmission between the non-volatile memory controller and the non-volatile memory devices;
Whereby when both the controller and all devices on a given channel are set to the normal mode, the controller and all devices on the given channel run in the normal mode; when the controller and all devices on the given channel are set to operate in the PAM mode, during an active data transfer phase, commands can be issued by the controller to a plurality of logical units on the same channel, and commands and/or status can be returned by the plurality of logical units on the same channel.

2. The system described in claim 1, wherein the configuration logic for realizing the normal mode or the PAM mode comprises: a mode register and/or configurable pins.

3. The system described in claim 2 wherein the mode register indicates whether the controller or the device is operating in normal mode or a PAM mode; the PAM state registers indicates whether the logic unit is in a normal state, PAM data transfer state, or PAM command receive state.

4. The system described in claim 1 wherein the communication bus that realizes command sending, status receiving and data transmission for each channel comprises: a bus that conforms to a non-volatile memory interface standard, and/or one or more: Command bus, status bus, data transmission bus.

5. The system described in claim 4, wherein the non-volatile memory interface standard is ONFI or Toggle for NAND flash memory.

6. The system described in claim 1, wherein the controller can simultaneously communicate with at least one non-volatile memory device having a normal mode and a PAM mode.

7. The system described in claim 1, wherein the active data transmission phase of the channel is when data is input to the logical unit of the device or data is output from the logical unit of the device.

8. A communication method that uses the system according to claim 1 to realize the configuration operation mode of a non-volatile memory controller and a non-volatile memory device, comprising:
The controller determining whether the logical unit of the device supports the PAM;
The controller determining whether the logical unit of the device is currently operating in normal mode or PAM;
The controller configuring the logical unit s in the device to the normal mode or the PAM mode through the PAM register.

9. A communication method that uses the system according to claim 1 to realize communication between a non-volatile memory controller and a non-volatile memory device, during when data is actively being transferred between the controller and devices the controller can:
Issue a command to the one or more alternative logical units;
Request the status of one or more logical units on the same channel of the logical unit that is actively transfer data;
Receive the status of one or more alternative logical units;
When the logical unit that is actively transfer data completes the data transfer, starts another data transfer with any one or more logical units.

10. The method of claim 9, further comprising: the Controller configuring the device to a PAM mode.

* * * * *